(12) United States Patent
Murata (10) Patent No.: US 8,538,662 B2
(45) Date of Patent: Sep. 17, 2013

(54) VARIABLE VALVE DEVICE FOR INTERNAL COMBUSTION ENGINE

(75) Inventor: Shinichi Murata, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 523 days.

(21) Appl. No.: 12/940,327

(22) Filed: Nov. 5, 2010

(65) Prior Publication Data

US 2011/0107988 A1    May 12, 2011

(30) Foreign Application Priority Data

Nov. 6, 2009  (JP) ................. 2009-254909

(51) Int. Cl.
*F01L 1/34* (2006.01)

(52) U.S. Cl.
USPC ....................... 701/103; 123/90.15

(58) Field of Classification Search
USPC .......... 701/103, 102, 101; 123/90.15, 90.16, 123/90.17, 90.31
See application file for complete search history.

(56) References Cited

U.S. PATENT DOCUMENTS

| 6,925,977 B2 * | 8/2005 | Hirowatari et al. | ........ 123/90.17 |
| 7,216,613 B2 * | 5/2007 | Shikata et al. | ............. 123/90.15 |

FOREIGN PATENT DOCUMENTS

| DE | 4226798 A1 | 2/1994 |
| EP | 1428991 A1 | 6/2004 |
| JP | 2002-89341 A | 3/2002 |
| JP | 2007-40279 A | 2/2007 |
| JP | 2009-144521 A | 7/2009 |
| JP | 2009-221867 A | 10/2009 |
| WO | WO 2008/012971 A1 | 1/2008 |

* cited by examiner

*Primary Examiner* — Hieu T Vo
(74) *Attorney, Agent, or Firm* — Birch, Stewart, Kolasch & Birch, LLP (57) ABSTRACT

In a variable valve device for an internal combustion engine, which has a cam phase variable mechanism including a split variable function, when the operation of the internal combustion engine is in a predetermined extremely low speed and load region, the phase of a second intake cam is controlled to a more advanced position (S1) than the phase in which the closing timing of a second intake valve is in a most retarded position.

4 Claims, 9 Drawing Sheets

VARIABLE VALVE DEVICE FOR INTERNAL COMBUSTION ENGINE

BACKGROUND OF THE INVENTION

1. Field of the Invention

The present invention relates to a variable valve device for internal combustion engines, and more particularly, to techniques for optimizing valve opening/closing timings of intake and exhaust valves.

2. Description of the Related Art

In recent years, more and more internal combustion engines (engines) have come to be equipped with cam phase variable mechanisms as a variable valve device for varying valve opening/closing timings (cam phases). Also, techniques have been developed whereby the cam phase variable mechanisms are applied to an engine having each cylinder provided with a plurality of intake valves and the valve opening/closing timings of all intake valves as well as only some of the intake valves are varied (split) in accordance with the operating condition of the engine (Japanese Laid-open Patent Publication No. 2009-144521).

Where the valve opening/closing timings of only some of the intake valves associated with the individual cylinders can be varied in this manner, the multiple intake valves can be made to open continuously as a whole, whereby highly flexible valve control can be executed so that the overall valve open period of the intake valves may be prolonged, making it possible to improve the operational performance of the engine.

In general, it is preferable to set the closing timing of the intake valve to a most retarded position when the internal combustion engine is in a low speed and load state because pumping losses can be reduced by retarding the closing timing of the intake valve. Based on this view, according to the above-mentioned publication, when the internal combustion engine is in the low speed and load state as seen during start-up, idling, etc., one among a plurality of valves (one between two valves in this specification), whose opening/closing timing is variable, is controlled to the most retarded position.

However, the inventors' research discloses that, if one of the valves, whose opening/closing timing is variable, is controlled to the most retarded position as described above during an extremely low speed and load period after the warm-up of the internal combustion engine as in a hot idling state, this reduces pumping losses but incurs phenomena, such as unstable combustion and inefficient fuel consumption. It is undesirable to deteriorate combustion stability and fuel consumption during the extremely low speed and load period after the warm-up of the internal combustion engine. Considering that the idling is frequently conducted, a sufficient improvement cannot be seen in the operating performance of the internal combustion engine.

SUMMARY OF THE INVENTION

It is an object of the invention to provide a variable valve device for an internal combustion engine, which is capable of preventing a deterioration in combustion stability and fuel consumption during an extremely low speed and load period after the internal combustion engine is warmed up, and improving operating performance of the internal combustion engine.

In order to accomplish the above object, the invention provides a variable valve device for an internal combustion engine comprising; a cam phase variable mechanism in which each cylinder includes a first intake valve driven by a first intake cam and a second intake valve driven by a second intake cam, the mechanism being capable of varying a phase of the second intake cam relative to the first intake cam, and a phase variable control unit that controls the cam phase variable mechanism, wherein the phase variable control unit controls the phase of the second intake cam to a more advanced position than a phase in which closing timing of the second intake valve is in a most retarded position, when the operation of the internal combustion engine is in a predetermined extremely low speed and load region.

In the variable valve device for an internal combustion engine, which has the cam phase variable mechanism including a split variable function for varying the phase of the second intake cam relative to the first intake cam, when the operation of the internal combustion engine is in the predetermined extremely low speed and load region, the phase of the second intake cam is controlled to the more advanced position than the phase in which the closing timing of the second intake valve is in the most retarded position. In the extremely low speed and load region, therefore, if the phase of the second intake cam is retarded by the cam phase variable mechanism having the split variable function, it is possible to reduce pumping losses successfully while accurately controlling intake-manifold pressure, but on the other hand, combustion stability and fuel consumption are deteriorated. However, the deterioration of combustion stability and fuel consumption can be prevented by controlling the phase of the second intake cam to the more advanced position than the phase in which the closing timing of the second intake valve is in the most retarded position in the extremely low speed and load region. Consequently, the operating performance of the internal combustion engine is improved.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE PREFERRED EMBODIMENTS

One embodiment of the invention will be described below with reference to the attached drawings.

Figure 1:
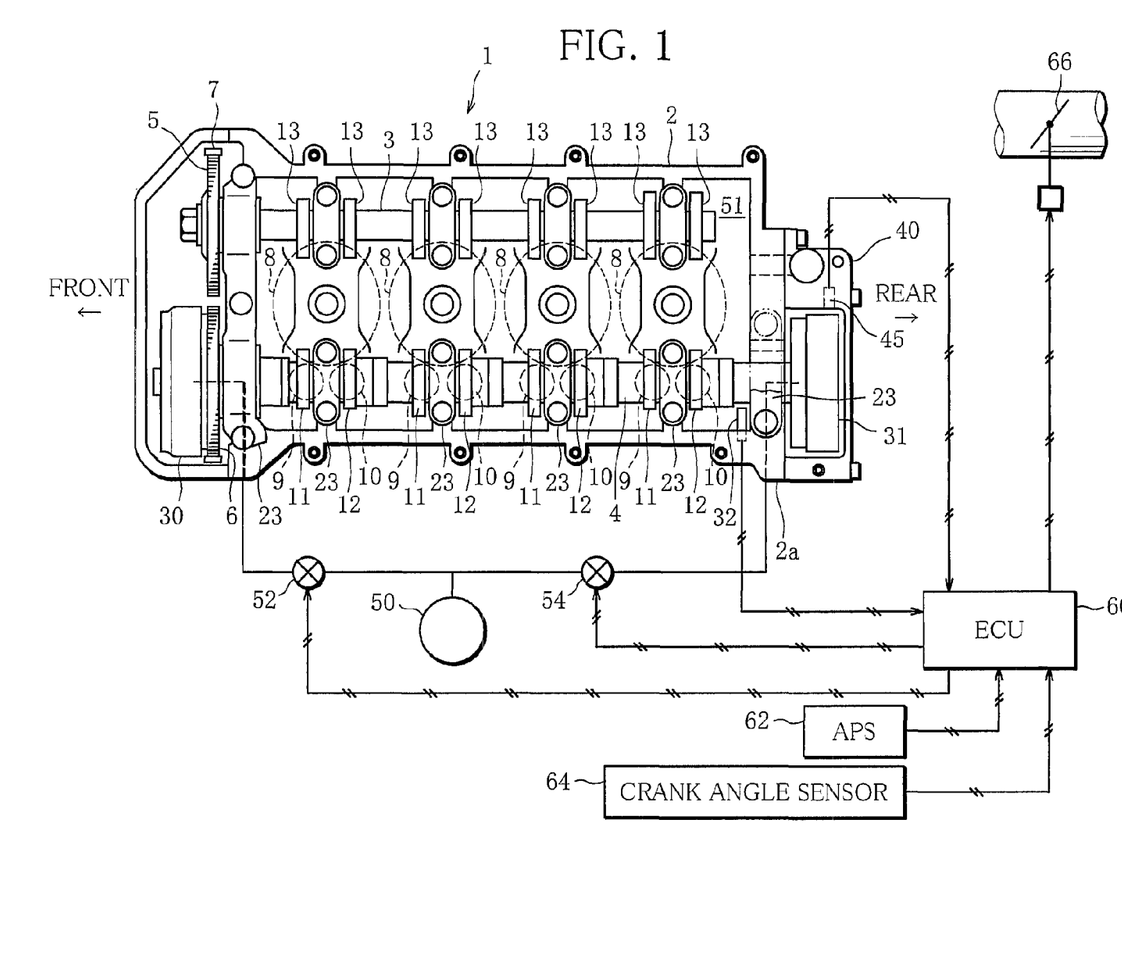
FIG. 1 illustrates a schematic construction of a variable valve device for an internal combustion engine according to the present invention.

FIG. 1 schematically illustrates the construction of a variable valve device for an internal combustion engine according to the present invention. More particularly, FIG. 1 is a top view showing the internal structure of a cylinder head 2 of an engine 1.

The engine 1 is, for example, an in-line four-cylinder engine with a DOHC valve train. As illustrated in FIG. 1, cam sprockets 5 and 6 are connected to an exhaust camshaft 3 and an intake camshaft 4, respectively, which are rotatably supported in the cylinder head 2. The cam sprockets 5 and 6 are interlocked to a crankshaft, not shown, through chains 7.

Disposed in each cylinder 8 of the engine 1 are two intake valves 9 and 10 and two exhaust valves, not shown. All pairs of intake valves 9 and 10 are driven by first intake cams 11 and second intake cams 12 which are alternately arranged in the intake camshaft 4. More specifically, the first intake valve 9 of a pair of the intake valves is driven by the corresponding first intake cam 11, and the second intake valve 10 by the corresponding second intake cam 12. The two exhaust valves are driven by respective exhaust cams 13 fixed to an exhaust camshaft 3.

The intake camshaft 4 has a double structure including a hollow outer camshaft and an inner camshaft inserted in the outer camshaft. The outer and inner camshafts are concentrically arranged with a small gap intervening between each other, and are turnably supported by a plurality of cam journals 23 formed in the cylinder head 2 of the engine 1.

The first intake cam 11 is fixed to the outer camshaft. The second intake cam 12 is turnably supported by the outer camshaft. The second intake cam 12 and the inner camshaft are fixed by means of a fixing pin penetrating through a long hole extending in a circumferential direction of the outer camshaft. Accordingly, the first intake cam 11 is driven by rotation of the outer camshaft, and the second intake cam 12 by rotation of the inner camshaft.

A first cam phase variable mechanism 30 and a second cam phase variable mechanism (cam phase variable mechanism according to the invention) 31 are provided to the intake camshaft 4. Used as the first cam phase variable mechanism 30 and the second cam phase variable mechanism 31 are, for example, a well-known vane-type hydraulic actuator. The vane-type hydraulic actuator is constructed so that a vane rotor is turnably disposed in a cylindrical housing (cover). The vane-type hydraulic actuator has a function to vary a vane rotation angle relative to the housing according to amount of hydraulic oil that is supplied from a hydraulic unit 50 through solenoid-operated hydraulic valves 52 and 54 into the housing, that is, according to hydraulic pressure.

The first cam phase variable mechanism 30 is placed in a front end of the in Lake camshaft 4. The cam sprocket 6 is fixed to a housing of the first cam phase variable mechanism 30. The outer camshaft is fixed to the vane rotor of the first cam phase variable mechanism 30.

The second cam phase variable mechanism 31 is placed in a rear end of the intake camshaft 4. The outer camshaft is fixed to a housing of the second cam phase variable mechanism 31. The inner camshaft is fixed to the vane rotor of the second cam phase variable mechanism 31.

With the above configuration, the first cam phase variable mechanism 30 functions to vary a rotation angle of the outer camshaft relative to the cam sprocket 6, whereas the second cam phase variable mechanism 31 functions to vary a rotation angle of the inner camshaft relative to the outer camshaft. In other words, the first cam phase variable mechanism 30 has a function to vary the opening/closing timing of all the first and second intake valves 9 and 10 relative to the opening/closing timing of the exhaust valves. The second cam phase variable mechanism 31 has a split variable function for varying phase difference (split amount) between the opening/closing timing of the first intake valve 9 and that of the second intake valve 10.

A first cam sensor 32 that detects an actual rotation angle of the outer camshaft is mounted on the cylinder head 2. Based upon information from the first cam sensor 32, an opening degree of the hydraulic valve 52 is adjusted, and the operation control of the first cam phase variable mechanism 30 is carried out.

The rear end of the intake camshaft 4 extends through a rear wall 2a of the cylinder head 2. The second cam phase variable mechanism 31 is disposed in the exterior of the cylinder head 2 and covered with an actuator cover 40.

The actuator cover 40 is provided with a second cam sensor 45 that detects an actual rotation angle of the inner camshaft by detecting the rotation timing of the vane rotor of the second cam phase variable mechanism 31.

This makes it possible to detect difference between the actual rotation angle of the inner camshaft and that of the outer camshaft on the basis of information from the second cam sensor 45 and that from the first cam sensor 32. Based upon the difference between the actual rotation angles, an opening degree of the solenoid-operated hydraulic valve 54 is adjusted, and the operation control of the second cam phase variable-mechanism 31 thus can be conducted.

The electronic control unit (ECU) 60 is a controller that conducts various kinds of controls of the engine 1, and is constructed of a CPU, a memory, etc. Connected to an input side of the ECU 60 are not only the first cam sensor 32 and the second cam sensor 45 but also various kinds of sensors including an accelerator position sensor (APS) 62 that detects an accelerator position of the engine 1, a crank angle sensor 64 that detects a crank angle of the engine 1, etc. Connected to an output side of the ECU 60 are various kinds of devices including a throttle valve 66 interposed in an intake passage to adjust an intake air flow rate, and the like, in addition to the solenoid-operated hydraulic valves 52 and 54, etc. Engine load is detected from the information about the accelerator position, which is detected by the APS 62. Engine speed Ne is detected from the information about the crank angle, which is detected by the crank angle sensor 64.

Operation of the variable valve device for an internal combustion engine according to the invention, which is thus constructed, will be described below.

Figure 2:
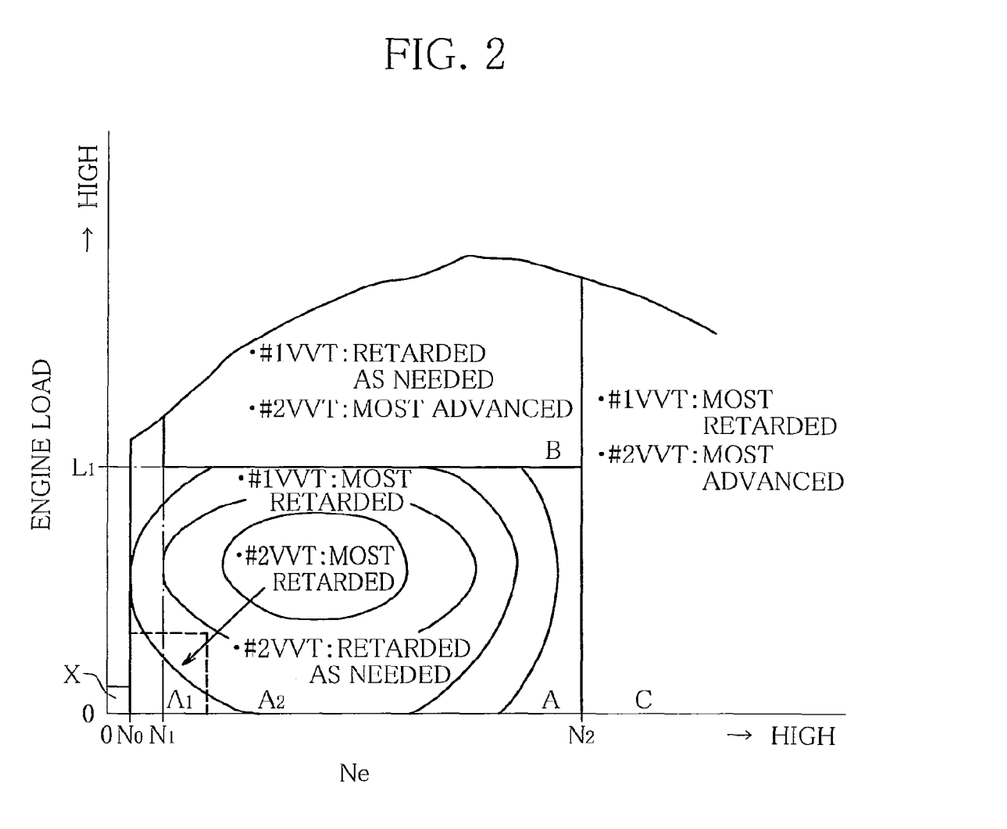
FIG. 2 illustrates a map used for controlling the operations of first and second cam phase variable mechanism.

The operation of the first cam phase variable mechanism 30 and the second cam phase mechanism 31 is controlled by the ECU 60 according to the operating state of the engine 1, namely, the engine load and the engine speed Ne, as shown in a map shown in FIG. 2 (phase variable control unit).

As shown in the map of FIG. 2, the operation control of the first cam phase variable mechanism 30 and the second cam phase variable mechanism 31 is conducted with respect to each of the following regions: a region X in which the engine 1 is started and warmed up; a low speed and load region A in which both the engine load and the engine speed Ne are low; a low-speed and high-load region B in which the engine load is high, and the engine speed Ne is low; and a high speed region C in which the engine speed Ne is high.

In the region X corresponding to the start-up and warm-up of the engine 1, there is no sufficient supply of hydraulic pressure from the hydraulic unit 50. A phase of the first cam phase variable mechanism (represented by "1st VVT" in FIG. 2) 30 is therefore locked at the most retarded position, and that of the second cam phase variable mechanism (represented by "2nd VVT" in FIG. 2) 31 at a most advanced position, by means of a locking pin.

In the region A, unlike in the region X where the engine 1 is started and warmed up, the first cam phase variable mechanism 30 is controlled to the most retarded position, and the second cam phase variable mechanism 31 to an appropriate phase, on the basis of the accelerator position information from the APS 62. To be concrete, when the engine speed Ne is equal to or higher than a predetermined value N0 but lower than a predetermined value N1, the hydraulic pressure supplied from the hydraulic unit 50 is small in amount. In comparison between the first and second cam phase variable mechanisms 30 and 31, the second cam phase variable mechanism 31 having a lower number of valves to be varied in phase enables higher controllability. For that reason, the first cam phase variable mechanism 30 is controlled to the most retarded position through the phase locking using a locking pin or by hydraulic pressure, and the second cam phase variable mechanism 31 is controlled to an appropriate phase. Also, when the engine load is lower than a predetermined value L1, and the engine speed Ne is equal to or higher than the predetermined value N1 but lower than a predetermined value N2, the first cam phase variable mechanism 30 is controlled to the most retarded position, and the second cam phase variable mechanism 31 to an appropriate phase.

In the region B, the first cam phase variable mechanism 30 is controlled to an appropriately retarded position, and the second cam phase variable mechanism 31 to a most advanced position. More specifically, based upon the accelerator position information from the APS 62, when the engine load is equal to or higher than a predetermined value L1, and the engine speed Ne is equal to or higher than the predetermined value N1 but lower than the predetermined value N2, the first cam phase variable mechanism 30 is controlled to an appropriately retarded position, and the second cam phase variable mechanism 31 to the most advanced position.

In the region C, as in the region X, the first cam phase variable mechanism 30 is controlled to the most retarded position, and the second cam phase variable mechanism 31 to the most advanced position. To be more precise, when the engine speed Ne is equal to or higher than the predetermined value N2, the first cam phase variable mechanism 30 is controlled to the most retarded position, and the second cam phase variable mechanism 31 to the most advanced position.

That is to say, in the region A where both the engine load and the engine speed Ne are low, the first cam phase variable mechanism 30 is locked at the most retarded position so that the second cam phase variable mechanism 31 is preferentially controlled. In the region B where the engine load is high, and the engine speed Ne is low, the second cam phase variable mechanism 31 is locked at the most advanced position so that the first phase variable mechanism 30 is preferentially controlled. In the region C where the engine speed Ne is high, the first and second cam phase variable mechanisms 30 and 31 are locked at the most retarded and advanced positions, relatively.

If at least either one of the first and second cam phase variable mechanisms 30 and 31 is locked, and the other is controlled in the foregoing manner, hydraulic pressure is not simultaneously supplied to the first and second cam phase variable mechanisms 30 and 31. Instead, the hydraulic pressure is supplied limitedly to at least either one of the first and second cam phase variable mechanisms 30 and 31. In each of the regions A, B and C, therefore, variation in hydraulic pressure supply is prevented, which enables a stable and accurate control of the first and second cam phase variable mechanisms 30 and 31.

In the result, the first intake valve 9 and the second intake valve 10 can be smoothly and freely operated in a continuous manner to prolong a valve-opening period. In the engine 1, pumping losses can be successfully reduced while intake-manifold pressure is precisely controlled. It is then possible to improve engine output and reduce fuel consumption.

In the region A where both the engine load and the engine speed Ne are low, the second cam phase variable mechanism 31 is controlled to the most retarded position in a central area of the region A. In a peripheral area of the region A, the mechanism 31 is advanced as moving away from the central area as shown by an arrow, thereby being controlled to an appropriately retarded position.

As shown by a broken line in FIG. 2, the region A is divided into a region A1 where the engine load and the engine speed Ne are extremely low, and a remaining region A2. The region A1 represents an extremely low speed and load region after the warm-up of the engine, including a hot-idling region, and the region A2 represents a common low speed and load region.

The extremely low speed and load region, or the region A1, is located in the peripheral area of the region A, which is away from the central area of the region A. For that reason, in the region A1 that is the extremely low speed and load region, the first cam phase variable mechanism 30 is controlled to the most retarded position as stated above, whereas the second cam phase variable mechanism 31 is controlled not to the most retarded position but to an appropriately retarded position located on a more advanced position than the most retarded position.

Figure 3A:
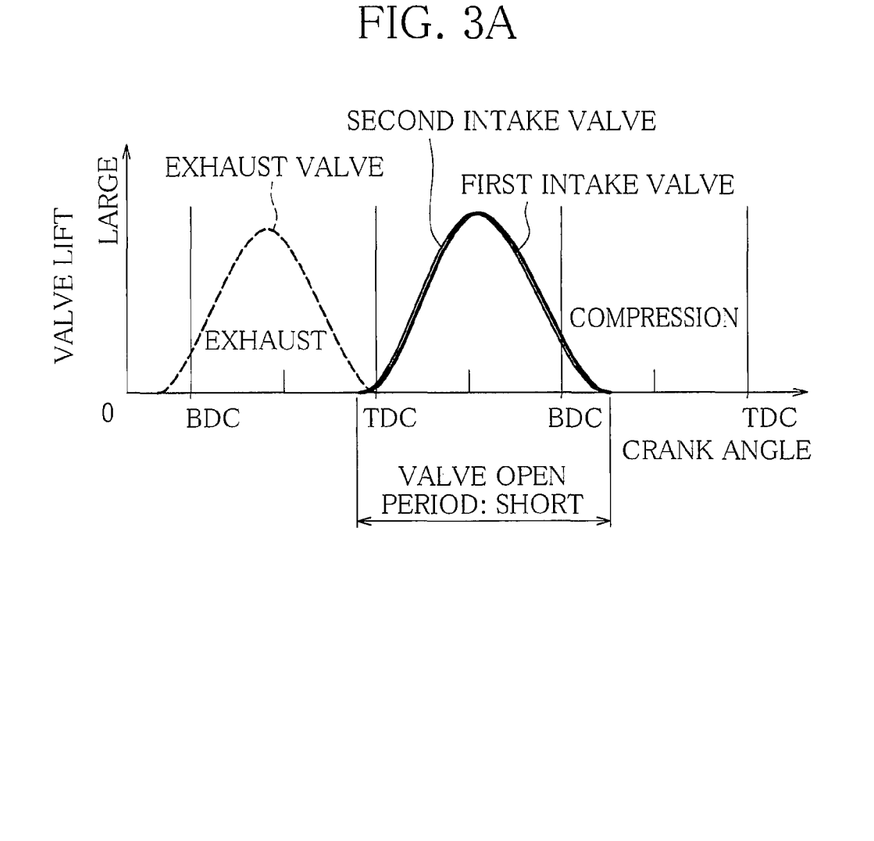
FIGS. 3(a), 3(b) and 3(c) individually illustrate the relationship of the crank angle of the engine with the lift amounts of first and second intake valves and an exhaust valve during the execution of operation control in a low-speed, low-load region.
Figure 3B:
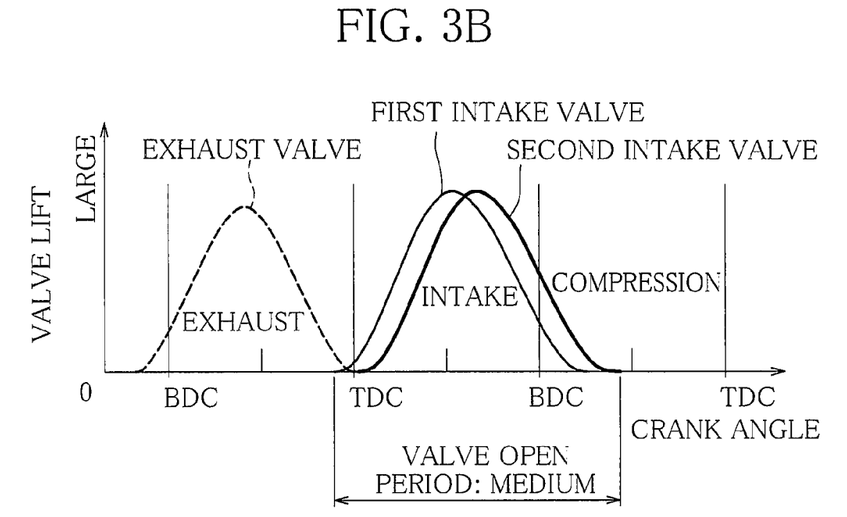
Figure 3C:
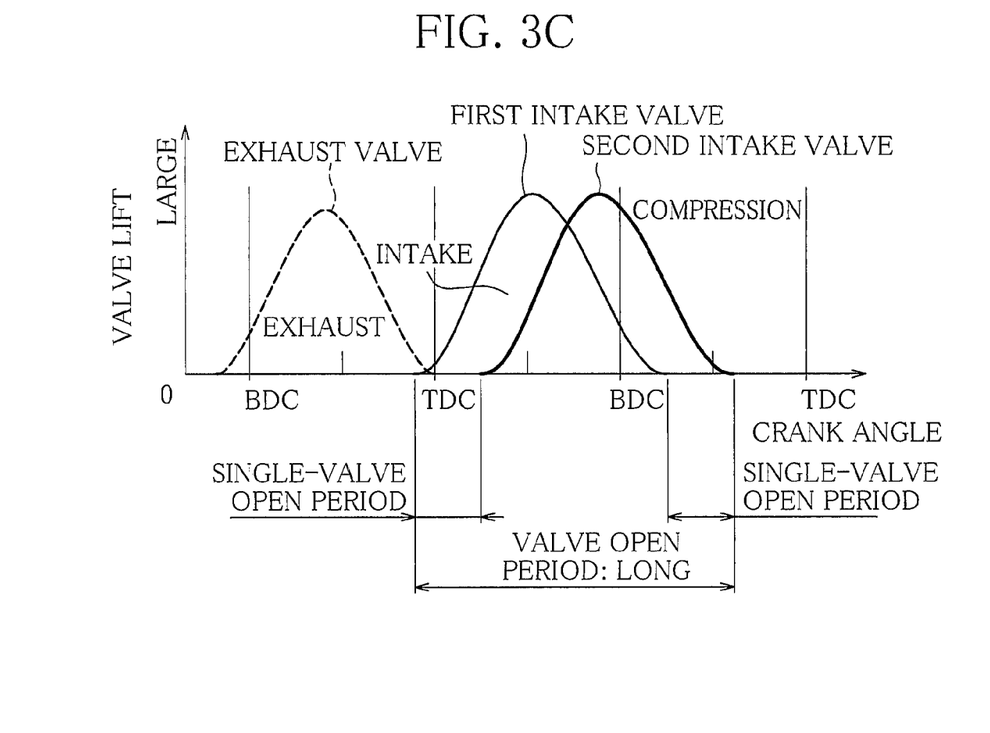

FIGS. 3(a), 3(b) and 3(c) show relationship of a crank angle of the engine 1 with a valve lift amount of the first and second intake valves 9 and 10 and exhaust valves when the operation control is conducted in the region A. FIG. 3(a) shows a case where actual compression ratio is increased, for example, by controlling the second cam phase variable mechanism 31 to the most advanced position as in the region X where the engine 1 is started and warmed up, and thus advancing the closing timing of the first and second intake valves 9 and 10, thereby enhancing flammability and stabilizing the combustion. FIG. 3(b) shows a case where pumping losses are reduced by controlling the second cam phase variable mechanism 31 to an appropriately retarded position in the extremely low speed and load region, or the region A1, and thus retarding the closing timing of the intake valves. At the same time, fuel consumption is improved by accelerating an in-cylinder flow which is caused by a time lag between the opening timing of the first intake valve and that of the second intake valve, and by enhancing combustion stability which is accomplished by a balance of the actual compression ratio reflected by the closing timing. FIG. 3(c) shows a case where the second cam phase variable mechanism 31 is controlled to the most retarded position in the central area of the region A within the region A2. This maximizes a phase difference between the opening/closing timing of the first intake valve 9 and that of the second intake valve 10, namely, a split amount, and minimizes the actual compression ratio due to the retardation of the closing timing of the intake valves. Moreover, pumping losses are reduced to the minimum, and the in-cylinder flow is accelerated, thereby enhancing the fuel consumption.

A reason that the second cam phase variable mechanism 31 is controlled not to the most retarded position but to the appropriately retarded position in the extremely low speed and load region, or the region A1, is because it has been found that if the split amount of the first and second intake valves 9 and 10 is maximized by controlling the second cam phase variable mechanism 31 to the most retarded position in the extremely low speed and load region, the combustion stability is rather deteriorated, and this degenerates the fuel consumption.

Figure 4:
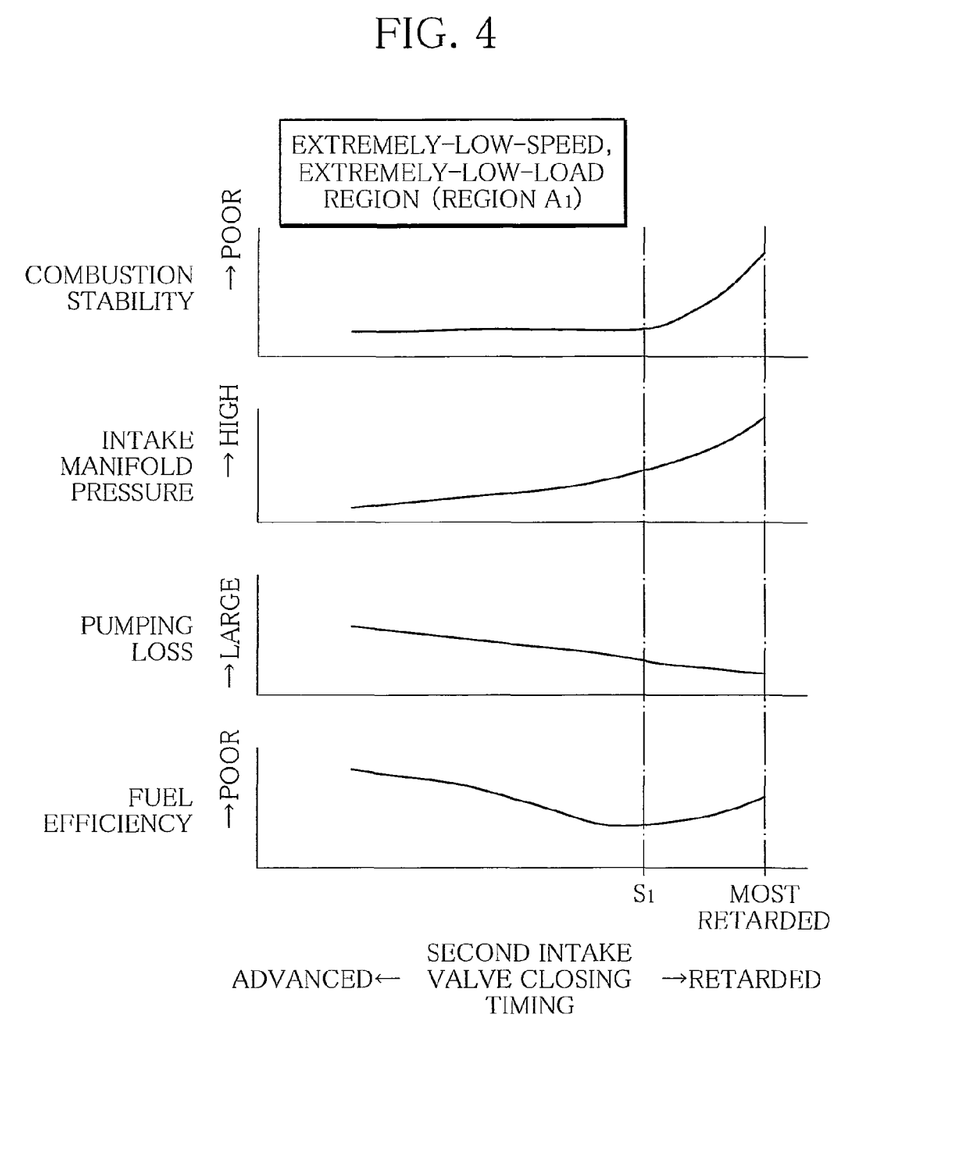
FIG. 4 illustrates the relationship of the valve closing timing of the second intake valve with combustion stability, intake manifold pressure, pumping loss, and fuel consumption.

In FIG. 4, relationship of the closing timing of the second intake valve 10 with combustion stability, intake-manifold pressure, pumping losses, and fuel consumption are shown in experimental values. According to FIG. 4, if the closing timing of the second cam phase variable mechanism 31, or that of the second intake valve 10, is shifted towards the retarded side, pumping losses can be successfully reduced while the intake manifold pressure is precisely controlled. On the other hand, the fuel consumption is degenerated along with the deterioration of the combustion stability.

Possible factors contributing to the deterioration of the combustion stability and fuel consumption, which is caused by the retardation of the second cam phase variable mechanism 31 in the extremely low speed and load region, are a combustion degradation attributable to a reduction in the actual compression ratio and an increase in heat loss resulting from too much acceleration of the in-cylinder flow, rather than the reduction of pumping losses.

On this account, in the extremely low speed and load region, the second cam phase variable mechanism 31 is controlled not to the most retarded position but to an appropriately retarded position that is, for example, a position S1 at which the combustion stability and the fuel consumption are most excellent or a position within a predetermined phase range around the position S1 as shown in FIG. 4.

In addition, when the second cam phase variable mechanism 31 is controlled to an appropriately retarded position instead of the most retarded position that is, for example, the position S1 in which the combustion stability and the fuel consumption become most excellent or a position within the predetermined phase range around the position S1 as shown in FIG. 4, the throttle valve 66 is controlled towards a closed position. This increases the intake manifold pressure and thus negative pressure in a combustion chamber, and promotes fuel vaporization, thereby further improving the combustion stability.

Another possible factor contributing to the deterioration of the combustion stability and fuel consumption after the retardation of the second cam phase variable mechanism 31 in the extremely low speed and load region is an increase in friction, which results from variation in lubrication condition in the intake camshaft 4 and the intake valves 9 and 10. Details will be explained below.

Figure 5:
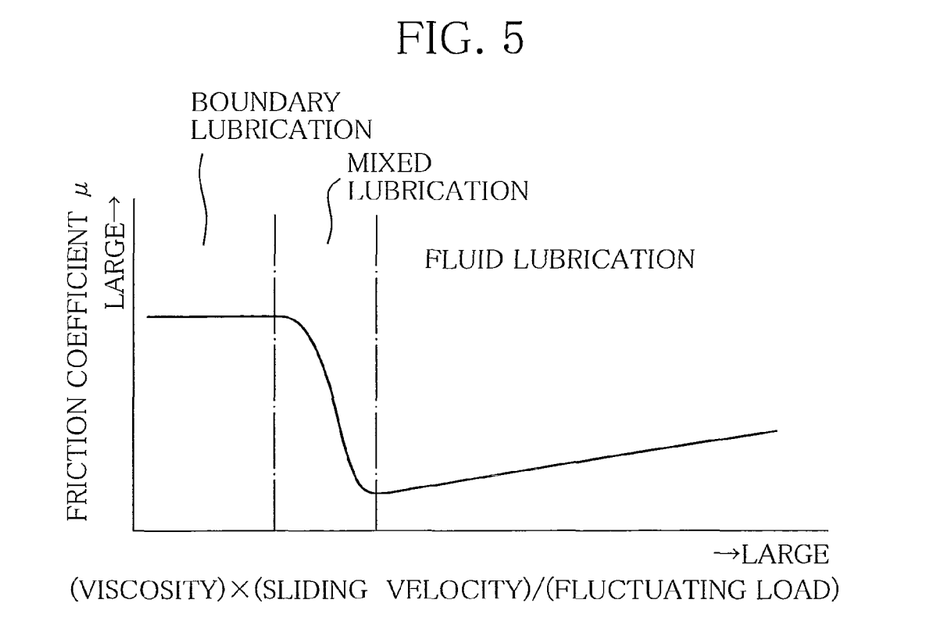
FIG. 5 is a Stribeck diagram.

Referring to FIG. 5, there is illustrated what is called a Stribeck diagram showing the relationship of the viscosity of lubricating oil, sliding velocity and fluctuating load {(viscosity)×(sliding velocity)/(fluctuating load)} with the state of lubrication. As seen from FIG. 5, the smaller the viscosity of the lubricating oil or the lower the sliding velocity or the larger the fluctuating load, the state of lubrication changes from fluid lubrication to mixed lubrication or further to boundary lubrication, with the result that the friction coefficient μ increases.

Figure 6:
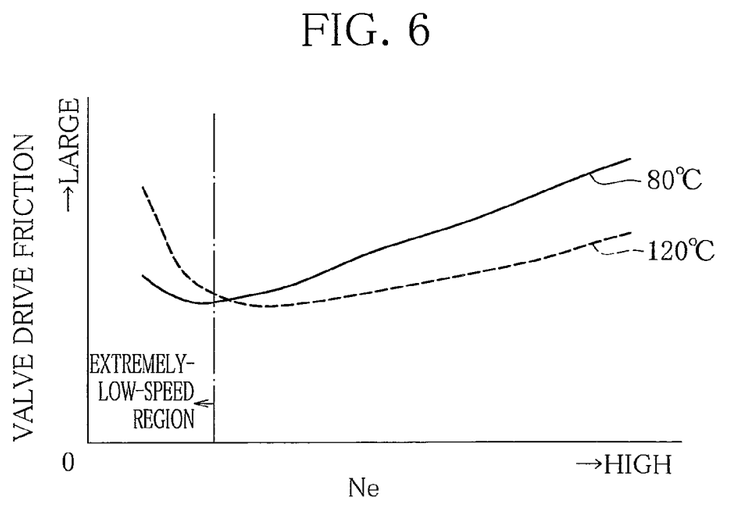
FIG. 6 illustrates the relationship of engine rotating speed Ne with valve drive friction and lubricating oil temperature.

As shown in FIG. 6, as the engine speed Ne decreases to be extremely low, a valve drive friction increases. In the extremely low speed region, the higher temperature the lubricant has, and the lower the viscosity of the lubricant is, the larger the valve drive friction becomes. This is the opposite of common friction.

Judging from FIG. 5, the engine speed Ne and sliding speed are low in the extremely low speed and load region after the warm-up of the engine in the first place, so that the boundary or mixed lubrication tends to occur. The higher the lubricant temperature is, and the lower the lubricant viscosity is, the more easily the boundary or mixed lubrication takes place. This increases the friction coefficient μ, and then increases the valve drive friction as well. As a result, the fuel consumption is further deteriorated.

Figure 7:
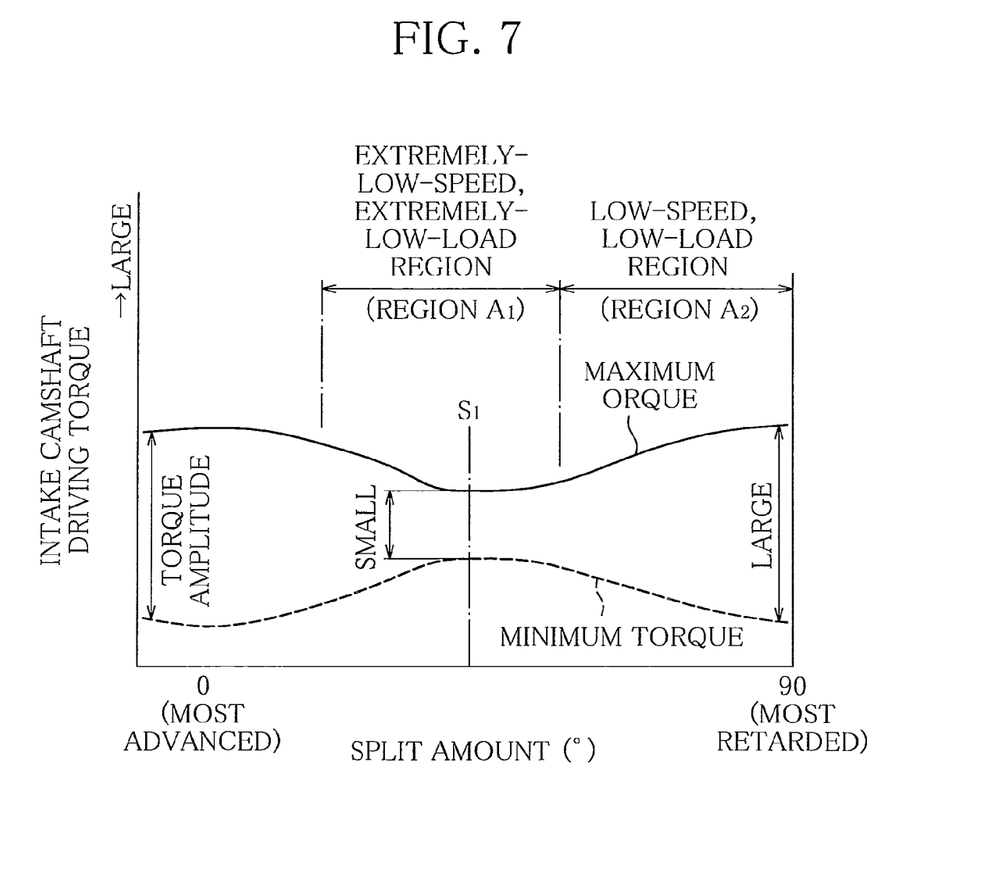
FIG. 7 illustrates the relationship of the amount of split between the first and second intake valves with torque applied to an intake camshaft.

On top of that, the fluctuating load is produced when the intake camshaft 4 is driven in the extremely low speed and load region. FIG. 7 relating to an intake cam drive torque shows the split amount of the first intake valve 9 and the second intake valve 10, and a maximum torque value (solid line) and a minimum torque value (broken line) within an amplitude of torque applied to the intake camshaft (shaft member) 4. When the closing timing of the second intake valve 10 is around the position S1 where the split amount is not very large, maximum torque that drives the intake camshaft 4 is lower, and the torque amplitude, or fluctuating load, is higher than when the closing timing of the second intake valve 10 is at the most retarded position where the split amount is large.

According to FIG. 5, the fluctuating load of the torque that drives the intake camshaft 4 is high at the most retarded position where the split amount is large. Accordingly, the lubrication condition in a system that drives the intake camshaft 4 or in a portion that rotatably supports the intake camshaft 4 tends to be the boundary or mixed lubrication. This increases the friction coefficient μ and the valve drive friction, and also deteriorates the fuel consumption. On the other hand, in the area close to the position S1 where the split amount is not very high, the fluctuating load of the torque that drives the intake camshaft 4 is low, so that it is easy to maintain the hydrodynamic lubrication. Consequently, the friction coefficient μ is maintained small, and the drive friction decreases, thereby preventing the deterioration of the fuel consumption.

For the above reason, in the extremely low speed and load region, the second cam phase variable mechanism 31 is controlled not to the most retarded position but to the appropriately retarded position that is more advanced than the most retarded position, which is, for example, the position S1 shown in FIG. 4, where pumping losses are reduced by retarding the closing timing of the second intake valve 10; the combustion stability is enhanced by the acceleration of the in-cylinder flow, which is caused by the time lag of the opening period of the first intake valve 9 and the second intake valve 10 and by the good balance of the actual compression ratio, which is acquired by adjusting the closing timing; and fuel consumption is most excellent due to small valve drive friction, or a position in the predetermined phase range around the position S1. By so doing, balance between the low fuel consumption and operating performance of the engine 1 can be improved in the low speed and load region, and especially in the extremely low speed and load region.

FIG. 7 shows the case in which only the intake cam drive torque is driven. In a DOHC-type engine, however, both intake and exhaust cam drive torques are driven by crank. Moreover, in a V-type engine, cam drive torques are added up together to be driven by crank. On this account, the second cam phase variable mechanism 31 may be controlled according to these collected drive torques.

This is the end of the description of the variable valve device for an internal combustion engine according to the invention, but the invention is not limited to the above-described embodiment.

For example, in the embodiment, in addition to the second cam phase variable mechanism 31 that varies a phase difference (split amount) between the opening/closing timing of the first intake valve 9 and the opening/closing timing of the second intake valve 10, there is provided the first cam phase variable mechanism 30 that varies the opening/closing timing of the first and second intake valves 9 and 10 as a whole. However, the invention can be successfully applied to an engine equipped with the second cam phase variable mechanism 31 only.

What is claimed is:

1. A variable valve device for an internal combustion engine comprising;
    a cam phase variable mechanism in which each cylinder includes a first intake valve driven by a first intake cam and a second intake valve driven by a second intake cam, the mechanism being capable of varying a phase of the second intake cam relative to the first intake cam, and
    a phase variable control unit that controls the cam phase variable mechanism, wherein:
    the phase variable control unit controls the phase of the second intake cam to a more advanced position than a phase in which closing timing of the second intake valve is in a most retarded position, when the operation of the internal combustion engine is in a predetermined extremely low speed and load region.

2. The variable valve device for an internal combustion engine according to claim 1, wherein:
    the closing timing of the second intake valve is at the most retarded position in a low speed and load region where speed and load are higher than in the predetermined extremely low speed and load region.

3. The variable valve device for an internal combustion engine according to claim 1, wherein:
    the internal combustion engine has a throttle valve that adjusts an intake air flow rate, which is interposed in an intake passage; and
    the phase variable control unit controls the throttle valve towards a more closed position than when the closing timing of the second intake valve is at the most retarded position.

4. The variable valve device for an internal combustion engine according to claim 1, wherein:
    the cam phase variable mechanism is formed by turnably disposing an inner camshaft in an outer camshaft formed of a pipe member, has a shaft member that can be driven by crank output of the internal combustion engine, is provided with the first intake cam in a peripheral area of the outer camshaft, is provided with the second intake cam so as to be turnable around an axis of the outer camshaft, and varies the phase of the second intake cam on the basis of the first intake cam at a relative displacement of the outer and inner camshafts; and
    the phase variable control unit controls the phase of the second intake cam into a predetermined phase range where a drive torque fluctuation of the shaft member, which is more advanced than the most retarded position, is smaller than a drive torque fluctuation in the most retarded position.

* * * * *